United States Patent [19]
Frevel et al.

[11] 3,966,418
[45] June 29, 1976

[54] GAS TREATMENT APPARATUS
[75] Inventors: Ludo K. Frevel, Midland; Leonard J. Kressley, Saginaw, both of Mich.
[73] Assignee: The Dow Chemical Company, Midland, Mich.
[22] Filed: Feb. 28, 1975
[21] Appl. No.: 553,958

Related U.S. Application Data
[62] Division of Ser. No. 433,935, Jan. 16, 1974, abandoned.

[52] U.S. Cl. .................... 23/284; 55/237; 55/238; 55/220; 55/223; 55/295; 55/296; 261/118; 261/DIG. 9; 423/242
[51] Int. Cl.² .................. C01B 17/56; B01D 50/00; B01J 1/00
[58] Field of Search ............... 23/284, 283; 55/296, 55/295, 237, 238, 220, 223; 261/118, DIG. 9; 423/242

[56]   References Cited
UNITED STATES PATENTS
| 1,738,717 | 12/1929 | Matlock | 55/296 X |
| 1,875,755 | 9/1932 | Noyes | 55/238 |
| 2,219,996 | 10/1940 | Livingston | 55/295 X |
| 3,713,277 | 1/1973 | Sackett, Sr. | 55/223 |
| 3,791,109 | 2/1974 | Gustavsson | 423/242 X |

Primary Examiner—James H. Tayman, Jr.
Attorney, Agent, or Firm—V. D. Clausen; J. M. Kuszaj; S. R. Wright

[57]   ABSTRACT

A gas treatment apparatus suitable for removing sulfur oxides and dust from gas streams is disclosed. The gas to be treated is conveyed through a conduit and past at least one nozzle positioned in fluid communicaton with the interior of the conduit. The nozzle injects an atomized solution, such as an alkali metal carbonate solution, into the gas. Solids formed by contacting the gas with the solution collect on the inner surface of a conical funnel-shaped portion of a hollow body. The hollow body includes a conduit portion in coaxial alignment with the hollow body. The solids are first removed from the hollow body by a screw conveyer positioned on the conical funnel-shaped portion and then withdrawn through a solids exit port. Gases formed by the contact of the gas with the injected solution are removed through a gas exit port in the hollow body and a gas passageway defined by the inner surface of the hollow body and the outer surface of the conduit portion.

1 Claim, 3 Drawing Figures

GAS TREATMENT APPARATUS

CROSS-REFERENCE TO RELATED APPLICATION

This is a division, of application Ser. No. 433,935, filed Jan. 16, 1974, now abandoned.

BACKGROUND OF THE INVENTION

The present invention relates broadly to the removal of sulfur oxides from a gas stream. More specifically the invention pertains to a gas treatment apparatus suitable for the removal of both sulfur oxides and dust, e.g. fly ash, from a gas stream wherein essentially no solid sulfur containing by-products are formed.

There are many methods known for the removal of sulfur oxides and dust from gas streams, e.g. power plant stack gases. A summary of these methods is given by A. V. Slack in "Removing $SO_2$ from Stack Gases", *Environmental Science J Technology*, Vol. 7, No. 2, p. 110–119 (February, 1973). However, associated with these methods is the problem of disposal of the sulfate and sulfite-containing compounds formed as by-products of the gas purification method. For example, sludge disposal difficulties are discussed in an article in *Chemical Week*, Dec. 12, 1973, p. 45, entitled "Sludges Mire Stack-Gas Cleaning". The sludge disposal problem is of increasing economic significance and, accordingly, a method of purifying stack gas without forming solid sulfur containing by-product, e.g. sulfates and sulfites, would be very useful.

Another problem in the treatment of stack gases is the presence of dust, i.e. particulate matter, along with gaseous impurities in the gas stream. A dust-containing stream may require, in addition to a gas scrubber to remove gaseous impurities, the use of an electrostatic precipitator or a second scrubber to remove the dust particles, particularly if the dust particles are relatively small. It would be desirable to remove both dust and gaseous impurities within one contacting device.

SUMMARY OF THE INVENTION

The present invention is a novel apparatus for the treatment of gas. The apparatus is especially suited for the removal of both sulfur oxides and dust, e.g. fly ash, from a gas stream wherein essentially no solid sulfur containing by-products are formed. The apparatus comprises a hollow body having a gas exit port in the ceiling thereof and a conical funnel-shaped portion with a solids exit port in the bottom thereof. A conduit for conveying the gas to be treated passes through the wall of and into the interior of the hollow body such that the portion of the conduit within the hollow body is aligned coaxially with the hollow body. The conduit has a first open end for introducing the gas to be treated and a second open end within the hollow body for discharge of treated material.

A gas passageway for removing gases formed during gas treatment is defined by the inner surface of the hollow body and the outer surface of the conduit portion. The gas passageway is in communication with the gas exit port. At least one nozzle is positioned in fluid communication with the interior of the conduit, such that an atomized solution for gas treatment is injected into the gas conveyed within the conduit. A screw conveyer is positioned on the inner peripheral surface of the conical shaped portion of the hollow body. The screw conveyer is supported on the inner peripheral surface by a ball and socket joint. A drive motor rotates the screw conveyer about its axis while circularly swiveling the screw conveyer over substantially the entire inner peripheral surface of the conical funnel-shaped portion, to remove any solids formed on this surface.

DETAILED DESCRIPTION OF THE INVENTION

Figure 1:
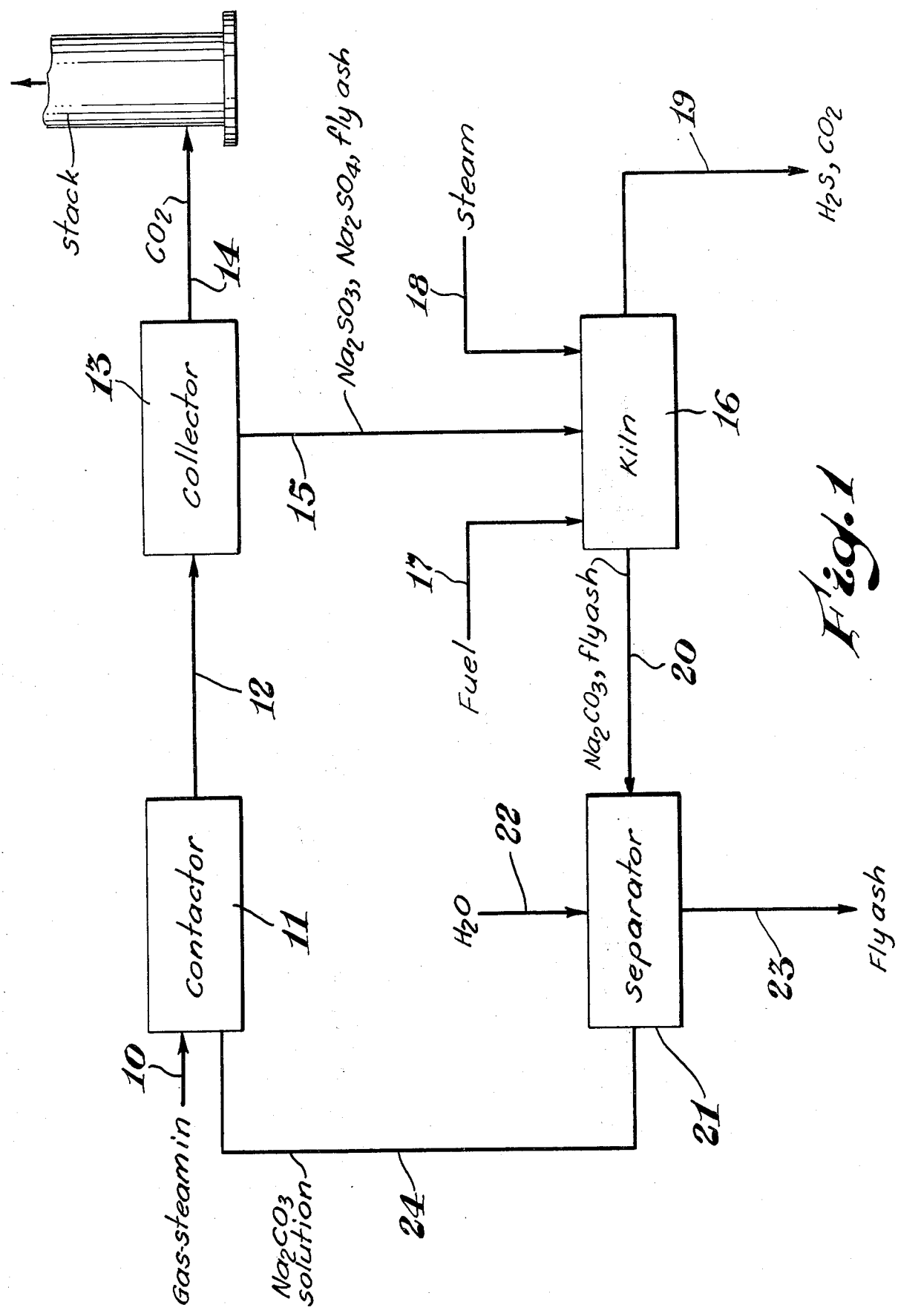
FIG. 1 illustrates, in schematic form, one method of removing sulfur oxides and dust from a gas stream.
Figure 3:
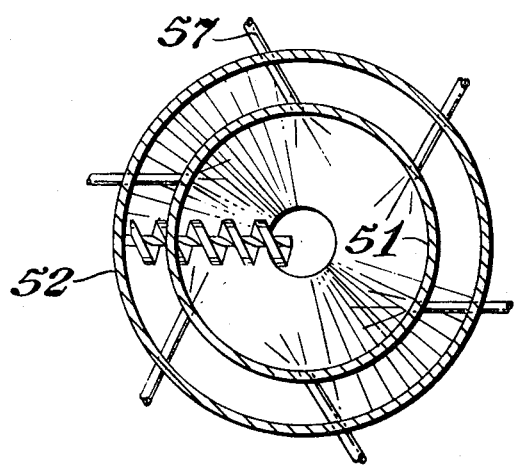
FIG. 3 is a section view of the nozzle array of the apparatus depicted in FIG. 2 the view being taken on line 3—3.

The method of operation of the present invention may be better understood by referring to FIG. 1.

A gas stream 10 containing sulfur oxides and dust, e.g. fly ash, if present, is conveyed into a contactor 11. A stream of a concentrated aqueous alkali carbonate solution 24, e.g. $Na_2CO_3$, is atomized and sprayed into the gas stream 10 in the contactor 11, forming $CO_2$ and wet salt particles, i.e. alkali metal sulfates and sulfites, onto which residual unreacted alkali metal carbonate and a substantial portion of the dust present, if any, agglomerate. The particles are conveyed by suspension in the gas stream from the contactor 11 to a collector 13. The solid particles are removed from the gas stream in the collector 13, and the purified gas stream 14 (also containing $CO_2$ produced by the aforesaid reaction) is vented to the atmosphere. The solid particles are carried by conveying means 15 to a kiln 16 into which a carbonaceous material 17 is added. The kiln is heated to a temperature in the range of about 620° to about 900°C. Such heating may desirably be furnished by combustion of the carbonaceous material. A stream of steam 18 is supplied to the kiln, promoting chemical reactions within the kiln to form gaseous $H_2S$ and $CO_2$, which are removed as stream 19, and a particulate mixture of $Na_2CO_3$ and dust which is carried by another conveying means 20 to a separator 21, e.g. a centrifuge. Sufficient hot water, furnished by a stream 22, is added to the particulate mixture to dissolve substantially all of the $Na_2CO_3$. The $Na_2CO_3$ solution is separated from the dust, e.g. by centrifuging, and is conveyed as stream 24 back to the contactor 11 to be sprayed into the gas stream 10. The dust is removed by yet another conveying means 23; it may be used in land fill applications, for example.

The aqueous alkali metal carbonate solution may comprise, for example, an aqueous solution of an alkali metal carbonate such as $Na_2CO_3$, $K_2CO_3$, $Rb_2CO_3$ or $Cs_2CO_3$. Of these $Rb_2CO_3$ and $Cs_2CO_3$ are considered at the present time to be economically unfeasible. $Na_2CO_3$ is the preferred alkali carbonate, based on its effectiveness both in the neutralization of sulfur oxides and in the agglomeration of suspended particulate matter. In the present application the preferred species $Na_2CO_3$ is used to illustrate the effectiveness of the alkali metal carbonates.

The alkali metal carbonate is preferably supplied in an aqueous solution. Not only is a solution easier to pump and convey than a slurry, but also the reaction of the gas stream and the alkali carbonate has been observed to be more efficient if the alkali carbonate is completely solubilized, as opposed to partially in suspension.

The alkali metal carbonate solution may be employed at virtually any temperature at which the solution is liquid. Increasing the temperature of the alkali metal carbonate solution increases the solubility of $SO_2$ therein. However, in the present reaction the particles of salt formed comprise, to a substantial degree, hollow spheres within whose interiors drops of the $Na_2CO_3$ solution become trapped. At lower temperatures the shells of the particulate spheres are porous enough that most of the $Na_2CO_3$ solution escapes from the spheres and is reacted. However, increasing the temperature of the $Na_2CO_3$ solution decreases the porosity of the spherical shells resulting in less efficient utilization of $Na_2CO_3$ solution. Lower temperatures such as about 20° to about 40°C are preferred because the overall amount of alkali carbonate which can be reacted rapidly with $SO_2$ is optimized in this temperature range.

The optimum concentration of the alkali metal carbonate in the aqueous solution is generally about 10 to 30 per cent by weight. The preferred concentration is from 14 to 17 per cent. It is found that in certain circumstances too high a concentration of the alkali metal carbonate will cause inordinately extensive formation of dust-like fines which may elude the capturing region in the collector. On the other hand, too low a concentration may result in failure to react with some portion of the sulfur oxides. Performing test runs on specific stack gas to be purified will permit determination of the optimum concentration of alkali metal carbonate to employ. The alkali metal carbonate solution may contain some alkali metal sulfates or sulfites and still be satisfactorily reactive with the sulfur oxides.

The gas stream to be purified according to the practice of the present invention may contain, in addition to sulfur oxides, such acid gases as HCl, HBr, HF, $HNO_3$, HCOOH or $CH_3COOH$. All of these compounds will be converted into solids by the method of the present invention and may be removed from the collector means. However, the sulfer oxides form salts (sulfates and sulfites) which may be converted into $H_2S$, $CO_2$, and alkali metal carbonates by the practice of the present invention, thus eliminating the problem associated with the disposal of sulfur containing solid by-products.

The gas stream may be at essentially any temperature. However, a particular advantage of the present method is that hot gas streams may be treated without substantially cooling them. Most liquid scrubbing techniques involve, as a consequence of contacting the gas with the scrubbing liquid, a considerable cooling of the gas stream. Cooling of the gas stream is disadvantageous in that a cooled gas stream, i.e. <45°C, lacks buoyancy - that is, the ability to rise into the atmosphere and be diluted and carried away by air currents. Nonbuoyant gases tend to "plume", i.e. to spread out and hang suspended at the same height as the point of discharge. This is a sufficiently nagging problem that ordinarily a scrubbed gas stream, cooled by a liquid scrubbing technique, is reheated to a temperature sufficient to restore its buoyancy. Energy is unnecessarily expended in this reheating process.

The hot gas stream, e.g. from a power plant, may be fed directly into the contactor 11. However, a coarse dust filter may be provided to remove larger particles, e.g. >0.01 inch in diameter. Although the gas stream may be treated at essentially any flow rate, it is preferably supplied to the contactor at linear flow rates of between about 1 and about 20 feet per second. A lower flow rate may result in uneconomical operation, whereas a higher flow rate may make the particles formed difficult to collect. If the source of the gas stream to be treated supplies the stream at a linear velocity greater or less than that desired, one possible remedy is to adjust the cross sectional area of the contactor relative to the cross sectional area of the gas stream supply duct to effect an increase or decrease in linear velocity, as desired.

The contactor 11 is an enclosed vessel within which a concentrated aqueous solution 24 of an alkali metal carbonate can be sprayed into the gas stream 10.

Positioned within the interior of the contactor are one or more atomizer nozzles to deliver an atomized aqueous solution, such as an alkali metal carbonate into contact with the gas stream. The nozzles have small aperatures, e.g. about 0.2 mm., to facilitate evolution of a fine spray. The nozzles may be located at various positions in the contactor. One appropriate arrangement involves the positioning of several nozzles in sequence, with the nozzles positioned relative to the sides of the contactor so that the spray contacts the gas stream over the entire cross sectional area of the contactor. For example, a nozzle emitting a radial spray pattern could be centered within a circular or rectangular cross sectional area.

The number of nozzles used depends on the efficiency of contacting desired and on the extent to which one nozzle permits liquid-gas contacting. Usually ten or fewer nozzles will be utilized. The nozzles may be oriented so as to spray the $Na_2CO_3$ solution concurrently, countercurrently, or at acute angles to the flow of the gas stream.

It has been found that passing the gas stream through the fog of $Na_2CO_3$ solution is much preferable to conventional gas-liquid contacting methods wherein the gas is passed through a liquid solution. In passing through a liquid, the gas encounters a hydrostatic back pressure proportional to the vertical distance traversed within the liquid. This back pressure, often 15–20 in. $H_2O$ in magnitude, must be overcome by pumping the gas through the liquid at sufficient pressure to cover the head. Pumping the enormous volumes of stack gas often encountered across a pressure differential of this magnitude is unfeasible from the standpoints of both economy and conservation of energy. In the present method of passing the gas through the $Na_2CO_3$ fog, a pressure differential of only about 0.1 inch $H_2O$ or less must be traversed, reducing drastically the amount of energy required.

The alkali metal carbonate, e.g. $Na_2CO_3$, reacts with sulfur oxides, e.g. $SO_2$, in the following manner:

$$SO_2 + Na_2CO_3 \text{(aq.)} \rightarrow Na_2CO_3 + CO_2\uparrow \qquad (1)$$

$$SO_3 + Na_2CO_3 \text{(aq.)} + \tfrac{1}{2} O_2 \rightarrow Na_2SO_4 + CO_2\uparrow \qquad (2)$$

Similar reactions occur with other acid gases; the products include $CO_2$, $H_2O$ (with hydrogen containing acid gases), and an alkali metal (e.g. sodium) salt of the acid gas.

The resulting mass consists of particles of alkali metal sulfates and sulfites and some unreacted alkali metal carbonate. Surprisingly, a substantial portion of the dust particles present attach and adhere to the alkali metal salts to form a solid agglomerate mass beneficially removing the dust from the gas stream. This mass and the remaining stack gas components, e.g. $CO_2$, are conveyed as stream buoyancy. into the collector 13.

The temperature of the aqueous $Na_2CO_3$ stream 24 as it comes from the separator generally is appropriate for reuse in contacting the gas stream 10. If the aqueous $Na_2CO_3$ solution is too cool, $Na_2CO_3$ may precipitate or the gas stream 10 may be sufficiently cooled so as to lose its byouancy, In this case the $Na_2CO_3$ solution may be heated prior to contacting the gas stream. The concentration of the $Na_2CO_3$ in the solution coming from the separator is generally within a suitable range and does not require adjustment prior to its contact with the gas stream 10. However, if needed water can be added or removed, e.g. in an evaporator, to optimize the $Na_2CO_3$ concentration for contacting purposes.

Figure 2:
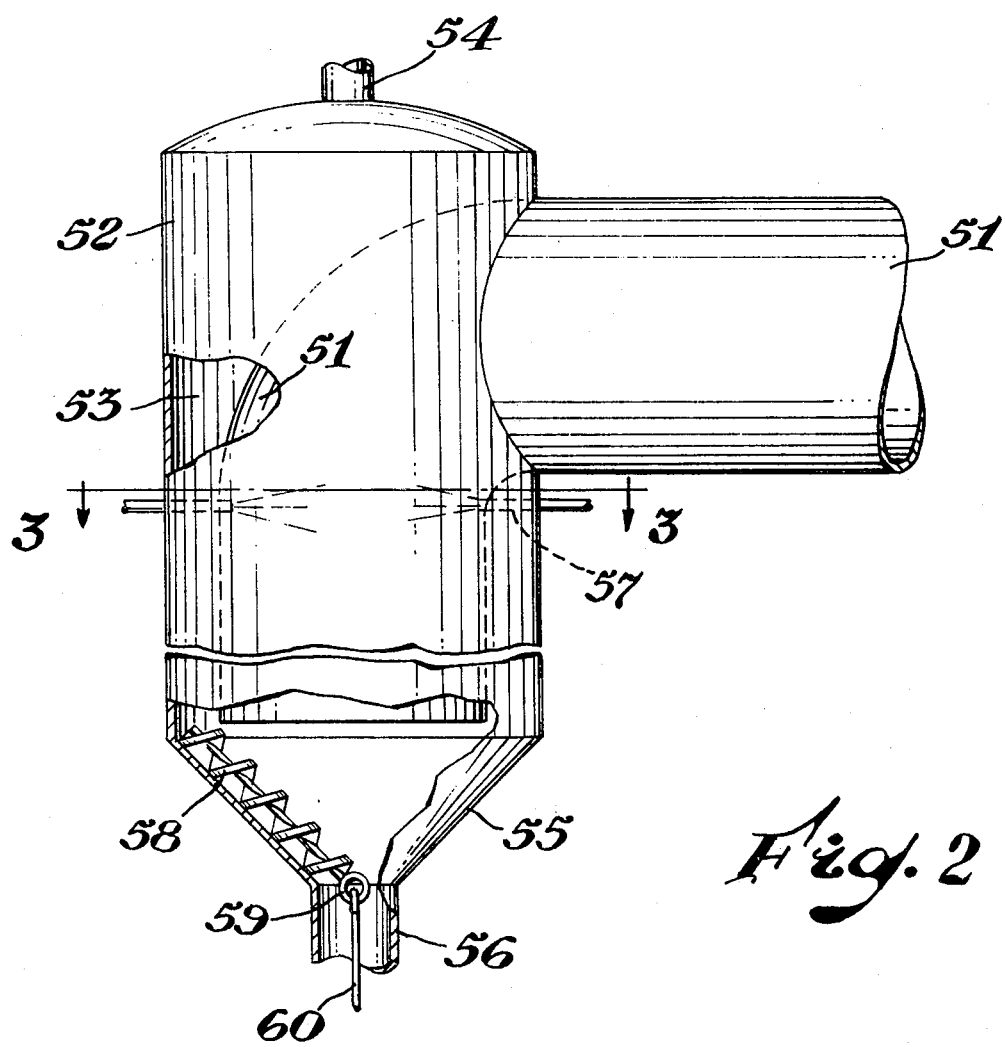
FIG. 2 illustrates, in side elevation partial section view, one embodiment of the present invention.

An emobdiment of the gas treatment apparatus of the present invention suitable for use as a contactor and collector is illustrated in FIG. 2. The apparatus comprises a closed conduit 51 having open ends which passes through a wall of and into the interior of a hollow body 52, in the present illustration turning a right angle so as to align coaxially with the body 52. A gas passageway 53 is defined between the outer surface of the conduit 51 and the inner surface of the body 52. The body 52 is provided with a gas exit port 54 in the ceiling thereof and a conical funnel shaped portion 55 having a solids exit port 56 in the bottom thereof. One or more nozzles 57 are positioned in fluid communication with the interior of the conduit 51, preferably at an acute angle relative to a radial from the center of the conduit 51 to the point of mounting of the nozzle 57, to impart a swirling motion to the atomized alkali metal carbonate solution injected by the nozzles. A screw conveyor 58 is rotatably and swivelably supported by a ball and socket joint 59 being adapted to rotate and contact substantially the entire inner peripheral surface of said funnel shaped portion 55. The screw conveyor 58 is powered by a drive means 60, the details of which are omitted, being of simple mechanical design. The distance between the nozzle 57 and the funnel portion 55 is long enough to permit a substantially complete reaction between the alkali metal carbonate and the sulfur oxides.

In operation the stack gas is conveyed in the conduit 51 past the nozzles 57 which inject atomized alkali metal carbonate solution into the gas, whereby the sulfur oxides in the gas and the alkali metal carbonate react to form a solid mixture of alkali metal sulfates and sulfites containing some unreacted alkali metal carbonate and agglomerated dust. This mixture collects on the interior surfaces of the funnel portion 55. The collected solids are removed by the rotating motion of the screw conveyor 58 about its axis while it is being swiveled circularly over the funnel surfaces. The removed solids are withdrawn through the solids exit port 56 and the purified gas and the $CO_2$ formed in the reaction, lighter than ambient air due to their warmer temperature, rise up and exit through the gas passageway 53 through the gas exit port 54.

what is claimed is:

1. A gas treatment apparatus comprising:
   a hollow body having a gas exit port in the ceiling thereof and a conical funnel-shaped portion with a solids exit port in the bottom thereof;
   a conduit for conveying gas, a portion of the conduit passing through a wall of and into the interior of the hollow body such that a portion of the conduit within the hollow body is aligned coaxially with the hollow body, the conduit having a first open end for introducing a gas to be treated into the hollow body and a second open end within the hollow body for discharging treated material from the hollow body;
   at least one nozzle for injecting an atomized solution into the gas conveyed in the conduit, the nozzle being positioned in fluid communication with the interior of the conduit, and the nozzle being located at an angle relative to a radial from the center of the conduit, such that a swirling motion is imparted to the injected solution;
   a gas passageway for removing gases formed during the gas treatment, the passageway being defined by the inner surface of the hollow body and the outer surface of the conduit portion, and the gas passageway being in communication with the gas exit port;
   a screw conveyer positioned on the inner peripheral surface of the conical funnel-shaped portion of the hollow body;
   means to support the screw conveyer on the inner peripheral surface;
   a drive means adapted to rotate the screw conveyer about its axis while circularly swiveling the screw conveyer over substantially the entire inner peripheral surface of the conical funnel-shaped portion, such that any solids deposited thereon during gas treatment are removed through the soild exit port by the motion of the screw conveyer.

* * * * *

UNITED STATES PATENT AND TRADEMARK OFFICE
CERTIFICATE OF CORRECTION

PATENT NO. : 3,966,418
DATED : June 29, 1976
INVENTOR(S) : Ludo K. Frevel et al.

It is certified that error appears in the above-identified patent and that said Letters Patent are hereby corrected as shown below:

In the abstract, line 4, delete "communcaton" and insert --communication--.

Column 1, line 19, delete "j" and insert --&--.

Column 2, line 36, after "furnished by" insert --the--.

Column 4, last line, delete "buoyancy" and insert in its place --12--.

Column 5, line 6, delete "byauancy" and insert --buoyancy--.

Column 5, line 14, delete "emobdiment" and insert --embodiment--.

Signed and Sealed this

Fourth Day of January 1977

[SEAL]

Attest:

RUTH C. MASON
Attesting Officer

C. MARSHALL DANN
Commissioner of Patents and Trademarks